United States Patent [19]

Keske et al.

[11] 4,348,513

[45] * Sep. 7, 1982

[54] INJECTION MOLDABLE AMIDE-IMIDE COPOLYMERS AND TERPOLYMERS

[75] Inventors: Robert G. Keske; James R. Stephens, both of Naperville, Ill.

[73] Assignee: Standard Oil Company (Indiana), Chicago, Ill.

[ * ] Notice: The portion of the term of this patent subsequent to Sep. 22, 1998, has been disclaimed.

[21] Appl. No.: 261,127

[22] PCT Filed: Jan. 7, 1981

[86] PCT No.: PCT/US81/00077

§ 371 Date: Jan. 7, 1981

§ 102(e) Date: Jan. 7, 1981

Related U.S. Application Data

[63] Continuation-in-part of Ser. No. 112,651, Jan. 16, 1980, Pat. No. 4,291,149.

[51] Int. Cl.$^3$ .............................................. C08G 73/14
[52] U.S. Cl. ...................... 528/188; 528/125; 528/128; 528/172; 528/173; 528/184; 528/185; 528/189; 528/226; 528/229; 528/335; 528/337; 528/348; 528/350; 528/352
[58] Field of Search .............. 528/350, 172, 173, 185, 528/188, 189, 226, 229, 335, 337, 348, 352, 125, 128, 184; 260/33.4 P; 264/325, 328.17, 331.19

[56] References Cited

U.S. PATENT DOCUMENTS

| | | | |
|---|---|---|---|
| 2,421,024 | 5/1947 | Summit | 528/350 |
| 3,654,227 | 4/1972 | Dine-Hart | 528/350 |
| 3,661,863 | 5/1972 | Campbell | 528/350 |
| 3,748,304 | 7/1973 | Stephens | 528/350 X |
| 3,817,942 | 6/1974 | Kovacs et al. | 528/350 |
| 3,842,026 | 10/1974 | Dixon et al. | 528/229 X |
| 3,862,092 | 1/1975 | Flowers et al. | 528/350 |
| 4,048,144 | 9/1977 | Stephens | 528/188 X |
| 4,066,631 | 1/1977 | Dimmig | 528/350 |
| 4,291,149 | 9/1981 | Keske et al. | 528/173 |

FOREIGN PATENT DOCUMENTS 570858 7/1945 United Kingdom ................ 528/350

*Primary Examiner*—Lester L. Lee
*Attorney, Agent, or Firm*—Gunar J. Blumberg; William T. McClain; William H. Magidson

[57] ABSTRACT

Novel copolymers and terpolymers of the amide-imide type are prepared from tricarboxylic acid anhydride compounds, N,N'-diacylated diamines, N-acylated diamines, and primary diamines. These copolymers and terpolymers are useful for preparing injection molded articles of superior properties. A novel process for the manufacture of amide-imide copolymers and terpolymers is disclosed wherein the imide, imide-imide, amide, and amide-amide moieties incorporated into the polymer backbone can be controlled by acylating the amine functionality which is to form the amide and amide-amide moieties while reacting directly those diamines with a tricarboxylic anhydride compound which are intended to form the imide and imide-imide moieties.

47 Claims, No Drawings

INJECTION MOLDABLE AMIDE-IMIDE COPOLYMERS AND TERPOLYMERS

This application is a continuation in part application of Ser. No. 112,651, filed Jan. 16, 1980, and now U.S. Pat. No. 4,291,149.

BACKGROUND OF THE INVENTION

1. Field of the Invention

The field of this invention relates to tailor-made amide-imide copolymers and terpolymers prepared from tricarboxylic acid anhydride derivatives, N,N'-diacylated diamines, N-acylated diamines and diamines and to molding resins and molded articles prepared therefrom.

2. Background

Amide-imide polymers and copolymers are a relatively new class of organic compounds known for their solubility in nitrogen-containing solvents when in the polyamic acid form. The major application of these amide-imides has been as wire enamels. This is illustrated in U.S. Pat. Nos. 3,817,942 (1974), 3,661,832 (1972), 3,494,890 (1970) and 3,347,828 (1967). British Specification No. 570,858 (1945) discloses the general state of the art. Amide-imide polymers and copolymers have also been found useful for molding application as shown in U.S. Pat. Nos. 4,016,140 (1977) and 3,573,260 (1971). Both are incorporated herein by reference. None of the foregoing references discloses tailor-made amide-imide copolymers and terpolymers.

The general object of this invention is to provide injection moldable linear high molecular weight amide-imide copolymers and terpolymers. A more specific object of this invention is to provide a novel process for preparing injection moldable tailored linear high molecular weight amide-imide copolymers and terpolymers by reacting acylated diamines with tricarboxylic acid anhydrides and diamines, at a temperature of about 50° to 700° F., wherein the imide, imide-imide, amide, amide-amide moieties incorporated into the polymer backbone can be controlled by acylating the amine functionality which is to form the amide and amide-amide moieties which polycondensation reaction is conducted at a temperature of about 300° to about 700° F. while reacting directly at a temperature of about 50° F. to about 400° F. those diamines with the tricarboxylic anhydride compound which are intended to form the imide and imide-imide moieties of the amide-imide copolymers and terpolymers. The molar ratio of the aromatic to aliphatic, cycloaliphatic and araliphatic diamines are suitably in the range of about 9:1 to 1:1, advantageously in the range of about 3:1 to 3:2.

In the novel process, the imide and imide-imide moieties incorporated into the polymer backbone are controlled by reacting at a temperature of about 50° to about 400° F. diamines with the tricarboxylic anhydride compound to form imide and imide-imide linkages and by the reaction of acylated diamines at a temperature of about 300° to about 700° F. to form amide and amide-amide linkages and sometimes acylated diamines at a temperature of about 350° F. to about 700° F. which form imide or imide-imide linkages. Generally the reaction of free amine groups is conducted prior to the reaction of acylated amine groups. Thus the initial temperature of the polymerization process is at the lower end of the ranges cited, from about 50° F. to about 400° F., and the final polymerization temperatures are in the range of about 300° F. to about 700° F. Generally, depending on the type of product desired, the range of acylation can be from about 40% of the total amine functionality up to 100% of the total amine functionality, preferably about 50–95% of the total amine functionality. Advantageously these monomers are mixed in the presence of solvents such as N-methylpyrrolidone, N,N-dimethylacetamide, acetic acid, etc. According to the process of this invention the copolymers and terpolymers may contain from two up to six different structural units set forth hereinbelow:

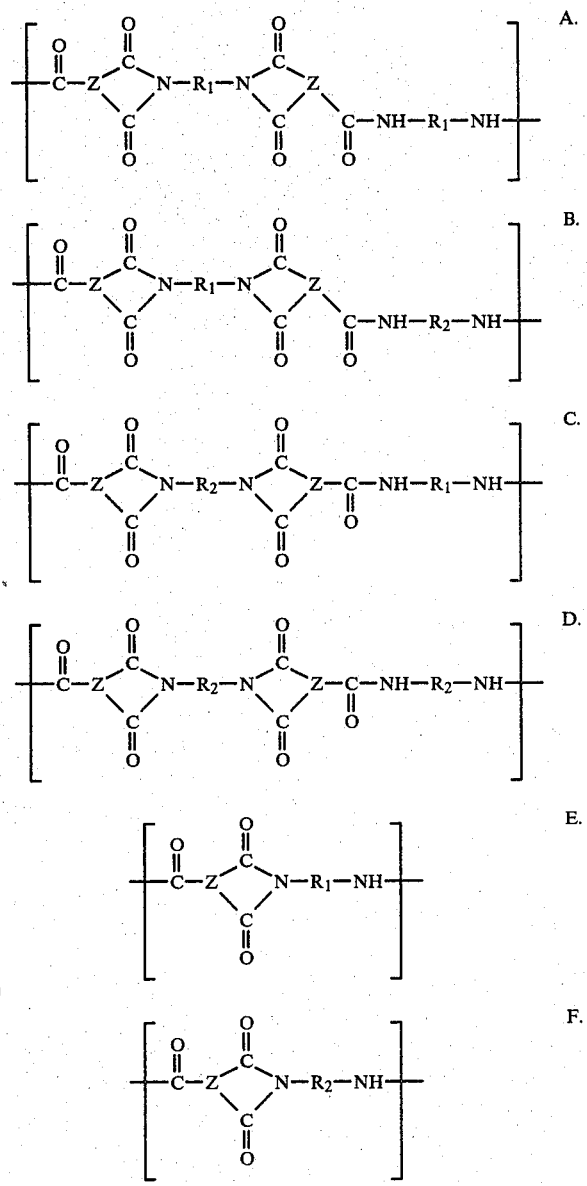

In the foregoing structural units Z is a trivalent aromatic radical. Z may be a trivalent radical of benzene, naphthalene, biphenyl, diphenyl ether, diphenyl sulfide, diphenyl sulfone, ditolyl ether, and the like.

Useful aromatic tricarboxylic acid anhydrides which contribute the trivalent radical moiety of Z include those compounds containing at least one pair of carboxyl groups in the ortho position with respect to each other or otherwise situated in a fashion which permits the formation of an anhydride structure, one other carboxyl group and from 9 to 21 carbon atoms. Within these limits, these compounds may contain one or more benzenoid rings such as, for instance, trimellitic anhydride and its isomers and multiring compounds such as the 1,8-anhydride of 1,3,8-tricarboxylnaphthalene. Usually these compounds contain up to three benzenoid rings. The preferred aromatic tricarboxylic acid anhydride employed in the novel process is trimellitic anhydride.

$R_1$ is a divalent aromatic radical of six to twenty carbon atoms joined directly or containing stable linkages consisting of —S—, —O—,

—SO$_2$—, —CO—, or methylene radicals. Aromatic diamines include para- and metaphenylenediamine, para- and meta-xylenediamine, paratoluenediamine, 2,4-toluenediamine, 2,6-toluenediamine, 3,5-toluenediamine, oxybis(aniline), thiobis(aniline), sulfonylbis(aniline), diaminobenzophenone, methylenebis(aniline), benzidine, 1,5-diaminonaphthalene, oxybis(2-methylaniline), thiobis(2-methylaniline), and the like. Examples of other useful aromatic primary diamines are the following: 2,2'-naphthalene diamine, 4,4'-naphthalene diamine, 2,2'-biphenylene diamine, 3,3'-biphenylene diamine, 4,4'-biphenylene diamine, and the like; 3,3'-dichlorobenzidine, ethylene dianiline (4,4'-diaminodiphenyl ethane), propylene dianiline (4,4'-diaminodiphenyl propane), and the like; ketodianiline, 3,3'-diaminodiphenyl sulfide, 4,4'-diaminodiphenyl sulfone, 3,3'-diaminodiphenyl sulfone, hexafluoroisopropylidenebis(4-phenyl amine), 4,4'-diamino-diphenyl methane, 2,6-diaminopyridine, bis(4-aminophenyl)diethyl silane, bis(4-aminophenyl)ethyl phosphine oxide, bis(4-aminophenyl)phenyl phosphine oxide, bis(4-aminophenyl)-N-phenylamine, bis(4-aminophenyl)-N-methylamine, 3,3'-dimethyl-4,4'-diaminobiphenyl, para-bis(2-methyl-4-amino-phenyl)-benzene, 3,3'-diaminoadamantane.

$R_2$ is a divalent aliphatic, cycloaliphatic or araliphatic radical of from two to eighteen carbon atoms derived from aliphatic diamines such as ethylenediamine, propylenediamine, 2,2-dimethylpropylene diamine, tetramethylenediamine, hexamethylenediamine, octamethylenediamine, nonamethylenediamine, decamethylenediamine, dodecamethylenediamine, 4,4'-diaminodicyclohexylmethane, meta- and paraxylylene diamine, 4,4'-diaminodicyclohexylethane, bis(aminocyclohexyl)propane, bis(para-aminocyclohexyl)sulfide, bis(aminocyclohexyl)sulfone, bis(aminocyclohexyl)ether, bis(aminocyclohexyl)diethyl silane, bis(aminocyclohexyl)ethyl phosphine oxide, bis(aminocyclohexyl)phenyl phosphine oxide, bis(aminocyclohexyl)N-phenyl amine, bis(aminocyclohexyl)-N-methyl amine, 1,2-bis(3-aminopropoxy)ethane, 3-methoxyhexamethylenediamine, 2,5-dimethylheptamethylenediamine, 5-methylnonamethylenediamine, 1,4-diaminocyclohexane, 1,2-diaminooctadecane.

The diamines can suitably be acylated with aliphatic acids or anhydrides such as acetic anhydride, acetic acid, proprionic anhydride, etc., or any aliphatic acid or anhydride containing from 2 to 8 carbon atoms per acid, preferably 2 to 4 carbon atoms per acid or 4 to 16 carbon atoms per anhydride, preferably 4 to 8 carbon atoms. Formic acid or anhydride cannot be used to acylate the diamines.

Utilizing the novel process, seven different classes of amide-imide copolymers and terpolymers have been prepared. Suitably each copolymer and terpolymer is prepared utilizing both aromatic and aliphatic diamines. Usually the molar ratio of the aromatic to aliphatic diamines is in the range of 9:1 to 1:1. Advantageously, this range has been found to be 3:1 to 3:2. The copolymers and terpolymers have structural units as shown in Table I hereinbelow.

TABLE I

| POLYMER CLASS | STRUCTURAL UNITS |
| --- | --- |
| I | A, B |
| II | A, C |
| III | A, B, C, D |
| IV | A, B, E |
| V | A, C, E |
| VI | A, B, C, D, E |
| VII | A, B, C, D, E, F |

In the polymers of Classes I, II, and III the tricarboxylic acid anhydride group in the polymer is ordered head to head and tail to tail due to the order of the acylation of the diamines. Specifically, the ratio of diacylated diamine, trimellitic anhydride, unacylated diamine is maintained at about 1:2:1. The polymer of Class I is suitably prepared by diacylating the aliphatic, cycloaliphatic or araliphatic diamine and part of the aromatic diamine. The remainder of the aromatic diamine is reacted with two equivalents of the tricarboxylic acid anhydride compound to produce a bis imide/bis acid intermediate. The reaction between the bis imide/bis acid and the diacetyl derivative of the aromatic diamine produces Structural Unit A. In a similar manner the reaction between the bis imide/bis acid and the diacetyl derivative of the aliphatic, cycloaliphatic or araliphatic diamine produces Structural Unit B. The random dispersion of Structural Units A and B along the copolymer and terpolymer backbone thus make up the complete structure of Polymer I. When the polymer is further polymerized under solid state polymerization conditions at a temperature of about 400° to 700° F. a high molecular weight injection moldable copolymer and terpolymer is obtained having inherent viscosity in the range of 0.3 to 2.0. For the purpose of this invention inherent viscosity is measured at 25° C. and 0.5% w/v in 60/40 w/w phenol/1,1,2,2-tetrachloroethane, N-methylpyrollidone or 100% sulfuric acid. The term "solid state polymerization" refers to chain extension of polymer molecules under conditions where the polymer molecules retain their solid form and do not become a fluid mass.

The copolymers and terpolymers of Class II are similar to polymers of Class I, but in this instance the aliphatic, cycloaliphatic and araliphatic diamine moieties are used directly to form imide groups (Structural Unit C) and the aromatic diamines are used to form either two amide groups by reaction of the diacylated derivative (Structural Unit A) or two imide groups by direct reaction of the diamine (Structural Unit C). The resultant Class II copolymers and terpolymers are made up of a random dispersion of units A and C. Class III copolymers and terpolymers are made up of Structural Units A, B, C and D and have all the trimellitoyl groups ordered head to head and tail to tail and all diamines are allowed either to form only two amide groups or two imide groups.

In copolymers and terpolymers of Class IV, V, and VI the aliphatic, cycloaliphatic and araliphatic diamines are used to form only di imide or di amide groups (Structural Units B, C, and D). Thus the trimellitoyl groups which are attached to the aliphatic or araliphatic diamines are ordered head to head or tail to tail. The aromatic diamines are acylated randomly, thus, some are diacylated while others are monoacylated or unacylated. The trimellitoyl groups which are attached to two aromatic diamine groups are randomly distributed between a head to head, a tail to tail, or a head to tail sequence (Structural Unit E). Polymer of Class IV is prepared by the reaction of diacylated alphatic, cycloaliphatic, or araliphaic diamines (which confines these amines to formation of two amide groups) with the tricarboxylic acid anhydride and un- or partially acylated aromatic diamines where the acylation level used is the amount that would give 50% acylation of all amine functionality utilized in the polymerization. By way of specific example, if a 3:1 ratio of aromatic to aliphatic diamine were used, all the aliphatic diamine would be diacylated and one third of the aromatic diamine functionality would be acylated. Polymer of Class V is prepared by the reaction of unacylated aliphatic, cycloaliphatic, or araliphatic diamines (which confines these amines to formation of two imide groups) with the tricarboxylic acid anhydride and fully or partially acylated aromatic diamines. The level of acylation can vary from 50% of the total amine functionality utilized in the reaction up to the aromatic diamine being fully diacylated. Polymer of Class VI is similar to the polymers of Class IV or V except that in polymers of Class VI the aliphatic diamines are used in both di imide or di amide formation and only about 50% of the total amine functionality is acylated. Polymers of Class VII are fully random in that both aliphatic diamine and aromatic diamine moieties are distributed between imide and amide portions and all trimellitoyl groups are free to be arranged head to head, tail to tail, or head to tail and 50 to 100% acylation of amine functionality is utilized. All of the foregoing polymers have an inherent viscosity in the range of 0.3 to 2.0 dl/g giving them molecular weights in the range of about 3,000 to 100,000. All these polymers can be injection molded and can be used as engineering plastics. They have excellent mechanical properties as shown in Table IV hereof.

With the use of Table II, a general method of preparation of these different polymers is herewith given. Polymers of Structural Classes I, II, III, V, and VII are prepared by first mixing and reacting the ingredients of columns J, K, and L usually in the presence of a solvent. If the acylating agent is active (e.g., an acid anhydride), reaction will occur readily at room temperature. When slow to react acylating agents (e.g., acetic acid) are used, this mixture must generally be heated to effect the proper amount of condensation. The reactants from columns P, Q, and R can be premixed, prereacted, or added separately to the prereacted mixture of J, K, and L. The solvent is removed by distillation and the mixture is polymerized under melt polycondensation conditions to yield the tailored polymer. Polymers of Structural Classes IV and VI are prepared by first mixing and reacting the ingredients of columns K and L, usually in the presence of a solvent. If the acylating agent is active (e.g., an acid anhydride), reaction will occur readily at room temperature. This is then followed by the addition of the ingredient from column P. After this mixture has reacted, the ingredients from columns Q and R can be added separately or in a premixed or prereacted form. When slow to react acylating agents are used (e.g., acetic acid), the mixture of K and L must generally be heated to effect the proper amount of condensation. After the addition of the ingredient from column P, a further period of heating will be required to effect the proper amount of condensation. After this mixture has reacted, the ingredients from columns Q and R can be added separately or in a premixed or prereacted form. The solvent is removed by distillation and the mixture is polymerized under melt polycondensation conditions to yield the tailored polymer. In certain cases the sequences of addition of reactants can be altered, but only to the extent that the level and type of acylation of the specific amine functionalities remain unchanged. In many cases, the melt prepared polymers from all structural classes are solid state polymerized prior to fabrication. However, further melt polymerization at 500°–700° F. may also be advantageously used in lieu of solid state polymerization to form the copolymer or terpolymer which is suitable for injection molding.

TABLE II

| STRUCTURAL CLASS | J MOLES OF ArDA | K MOLES OF RDA | L MOLES OF ACYLATING AGENT | P MOLES OF ArDA | Q MOLES OF RDA | R MOLES OF TMA |
|---|---|---|---|---|---|---|
| I | $\frac{X}{2} - T$ | T | X | $\frac{X}{2}$ | O | X |
| II | $\frac{X}{2}$ | O | X | $\frac{X}{2} - T$ | T | X |
| III | $\frac{X}{2} - M$ | M | X | $\frac{X}{2} - T + M$ | T − M | X |
| IV | O | T | X | Y | O | X |
| V | Y | O | X to 2Y | O | T | X |
| VI | O | M | X | Y | T − M | X |
| VII | Y | T | X to 2X | O | O | X |

Acylating agents include acetic anhydride, acid or propionic acid or anhydride, etc., or any aliphatic acid or anhydride containing from 2 to 8 carbon atoms per acid, preferably 2 to 4 carbon atoms per acid or 4 to 16 carbon atoms per anhydride, preferably 4 to 8 carbon atoms. Formic acid cannot be used as an acylating agent in this process.

| | |
|---|---|
| X = total moles TMA | TMA = Trimellitic Anhydride |
| Y = total moles ArDA | ArDA = Aromatic Diamine |
| T = total moles RDA | RDA = Aliphatic Diamine |
| X = Y + T | O < M < T < Y |

By way of particular example, if it is desired to produce an amide-imide copolymer and terpolymer of Structural Class V wherein the ratio of aromatic to aliphatic diamines is 3 to 1 then X=4, Y=3 and T=1, and 3 moles of the aromatic diamine are acylated with 4 to 6 moles of the acylating agent. The acylating agent may be acetic acid, acetic anhydride or propionic anhydride or any aliphatic acid which contains from 2 to 8 carbon atoms or anhydride which contains from 4 to 16 carbon atoms. 4 moles of trimellitic compound are mixed or reacted with 1 mole of aliphatic diamine, or added separately to the acylated diamine mixture. The mixing is conducted in the presence of solvents such as N-methylpyrrolidone, N,N-dimethylacetamide, acetic acid, etc. The organic polar solvent is removed by distillation and the mixture is polymerized under melt polymerization conditions to yield an injection moldable copolymer and terpolymer of Class V. The novel process enables one to tailor the polymerization so that different structural classes can be incorporated depending on the properties desired in the resulting product. By way of specific examples, if long term thermal stability is of prime importance, one may wish to incorporate the aliphatic, cycloaliphatic or aralphatic into formation of the more stable imide group as shown in Structural Classes II and V. If impact is of prime importance, the polymers with a more random structure (Classes IV, V, VI, and especially VII) tend to have better impact properties. These copolymers and terpolymers have an inherent viscosity of 0.3 to 2.0 and heat deflection temperatures greater than 300° F. without the use of fillers or fiber reinforcements. Although the first-stage melt polymerization products have an inherent viscosity of at least 0.2 dl/gram and can be used for injection molding application, it is generally preferable to start with a copolymer having been solid state polymerized or further melt polymerized.

The solid state polymerization which can be carried out below the melting point of the polymer can be conducted in several ways. However, all of the techniques require heating the ground or pelletized copolymers and terpolymers below the polymer melting point, generally at a temperature of about 400° 550° F., while either sparging with an inert gas, such as nitrogen or air, or operating under vacuum.

According to the novel process of this invention linear, high molecular weight copolymers and terpolymers have been prepared containing both aromatic and aliphatic moieties by a melt process. This in itself is a novel process feature since the prior art teaches only interfacial and solution polymerization techniques for the production of fully ordered head to head, tail to tail and completely random amide-imide polymers. Furthermore, according to the novel process a method for tailor-making amide-imide copolymers and terpolymers has been disclosed. These copolymers and terpolymers have excellent mechanical and thermal properties and can be readily injection molded. This injection moldability of these polymers can be partially contributed to the fact that these polymers are linear and are not cross-linked. Injection molding of the copolymers and terpolymers is accomplished by injecting the polymer into the mold maintained at a temperature of about 150°–450° F. In this process a 0.1–2.0 minute cycle is used with a barrel temperature of about 425° F. to 650° F. The injection molding conditions are given in Table III.

TABLE III

| | |
|---|---|
| Mold Temperature | 150–450° F. |
| Injection Pressure | 1000–40,000 psi and held for 0.5–20.0 seconds |
| Back Pressure | 0–500 psi |
| Cycle Time | 6–120 seconds |
| Extruder: | |
| Nozzle Temperature | 425° F. to 650° F. |
| Barrel Zones | 425° F. to 650° F. |
| Screw: | |
| 10–200 revolutions/minute | |

The mechanical properties of the copolymers and terpolymers prepared in Examples 1–10 are given in Table IV. Examples 11–14 teach the preparation of the 3:2:1 trimellitic anhydride:m-toluenediamine:1,6-hexanediamine polymers. The mechanical properties are given in Table V and show how the increase in randomness in going from Class V to Class VII increases impact. Table VI, however, shows how the direction of the aliphatic diamine to only imide formation in Class V can give better thermal stability.

TABLE IV
MECHANICAL PROPERTIES OF COPOLYMERS AND TERPOLYMERS

| Polymer Class | ASTM Method | V | IV | VII | V | IV | IV | VII | V | V |
|---|---|---|---|---|---|---|---|---|---|---|
| ArDA/RDA | | MBA/HMDA | MBA/HMDA | MBA/HMDA | MBA/MXDA | MBA/MXDA | MPDA/HMDA | MPDA/HMDA | OBA/MXDA | OBA/MXDA |
| ArDA/RDA ratio | | 3/1 | 3/1 | 3/1 | 3/1 | 3/1 | 3/1 | 3/1 | 3/2 | 2/1 |
| Tensile Strength, psi | D-638 | 17,100 | 13,100 | 18,500 | 19,500 | 9,500 | 15,900 | 13,700 | 18,100 | 21,640 |
| Tensile Modulus, psi | D-638 | 360,000 | 361,000 | 363,000 | 408,000 | 405,000 | 437,000 | 450,000 | 472,000 | 488,000 |
| Elongation at Break, % | D-638 | 8.2 | 5.5 | 16.9 | 17.1 | 2.9 | 5.3 | 4.1 | 11.7 | 17.1 |
| Flexural Strength, psi | D-790 | 24,400 | 22,200 | 23,500 | 26,600 | 14,100 | 26,700 | 26,700 | 28,400 | 30,200 |
| Flexural Modulus, psi | D-790 | 501,000 | 451,000 | 460,000 | 527,000 | 508,000 | 584,000 | 573,000 | 586,000 | 614,000 |
| Izod Impact, ft.lb./in. notch | D-256 | 0.46 | 0.38 | 1.99 | 0.38 | 0.36 | 0.36 | 0.33 | 0.42 | 0.63 |
| Tensile Impact, ft. lb./in.$^2$ | D-1822 | 56.2 | 32.1 | 72.3 | 120 | 6.5 | 50.7 | 48.0 | 56.9 | 38.3 |
| H.D.T. @ 264 psi, °F | D-648 | 401 | 398 | 412 | 420 | 415 | 433 | 432 | 413 | 424 |
| Density | | 1.29 | 1.29 | 1.29 | 1.30 | 1.30 | 1.35 | 1.35 | 1.33 | 1.34 |
| Inherent viscosity | | 1.01 | 0.99 | 0.91 | 0.81 | 0.62 | 0.92 | — | 1.26 | 1.41 |
| Example # | | 1 | 5 | 9 | 6 | 7 | 4 | 10 | 2 | 8 |

ArDA = Aromatic diamine
RDA = Aliphatic diamine
MBA = Methylenebisaniline
HMDA = 1,6-Hexanediamine
MXDA = Metaxylylenediamine
OBA = Oxybisaniline
MPDA = Metaphenylenediamine The following Examples illustrate the preferred embodiments of this invention. It will be understood that these Examples are for illustration purposes only and do not purport to be wholly definitive with respect to the conditions or scope of this invention.

EXAMPLE 1—Preparation of the 4:3:1 TMA:MBA:HMDA Polymer of Structural Class V A five liter three-necked flask, equipped with a variable speed, mechanical stirrer, nitrogen sparge tube on a pressure-equalizing addition funnel, and a distillation head and condenser was charged with 594 g (3.0 moles) methylenebisaniline and 400 ml of dimethylacetamide (DMAC). The nitrogen sparge and stirring were started and acetic anhydride, 408 g, (4.0 moles) was added over 5 minutes. Trimellitic anhydride, 768 g, (4.0 moles) was added over seven minutes. This was followed by the addition of 116 g (1.0 mole) of 1,6-hexanediamine in 200 ml of DMAC over a period of 5 minutes. The temperature of the spherical heating mantle surrounding the bottom half of the flask was set at 620° F. and the Variac controlling the top half was set at 40. After 105 minutes approximately 950 ml had distilled and the temperature of the bottom half of the mantle was then increased to 690° F. and the Variac to 50. After 25 minutes more, 50 ml more distillate was collected and house vacuum (20 in Hg) was drawn on the system. After 25 minutes under vacuum about 50 ml of distillate was collected and the polymer had become extremely viscous. After cooling and grinding the polymer had an inherent viscosity of 0.44 dl/g in 60:40 w/w phenol:tetrachloroethane or 0.68 dl/g in 100% sulfuric acid at 25° C. and 0.5% w/v concentration. The polymer was solid state polymerized by heating at 491° F. for 16 hours under high vacuum (0.1 mm Hg). The inherent viscosity increased to 1.01 dl/g in 60:40 w/w phenol:tetrachloroethane at 25° C. and 0.5% w/v concentration. The mechanical properties for this polymer are given in Column 1 of Table IV.

Example 2—Preparation of the 5:3:2 TMA:OBA:MXDA Polymer of Structural Class V A five liter three-necked flask, equipped with a variable speed, mechanical stirrer, nitrogen sparge tube on a pressure-equalizing addition funnel, and a distillation head and condenser was charged with 480 g (2.4 mole) of oxybisaniline and 700 ml of acetic acid. The nitrogen sparge (375 cc/min) and stirring were started and acetic anhydride, 408 g, (4 moles) was added over 3 minutes. Trimellitic anhydride, 768 g, (4.0 mole) was added over 6 minutes. This was followed by the addition of 217.6 g (1.6 mole) of metaxylylenediamine over 1 minute. The temperature of the bottom half of the spherical heating mantle surrounding the flask was set at 650° F. and the Variac controlling the top half was set at 30. After 54 minutes 550 ml of distillate had been collected and the temperature was raised to 675° F. After 156 minutes more an additional 590 ml of distillate had been collected, the polymer melt was quite thick. Stirring was continued for 13 minutes under house vacuum (20 in Hg). The polymer was then cooled under nitrogen and ground. The polymer had an inherent viscosity of 0.33 dl/g in 60:40 w/w phenol:tetrachloroethane at 25° C. and 0.5% w/v concentration. The polymer was solid state polymerized by heating under vacuum (0.40–0.80 mm Hg) for 17 hours at 490° F. and 16 hrs. at 510° F. During this time the inherent viscosity of the polymer increased to 1.26.

Example 3—Preparation of a 4:3:1 TMA:MBA:HMDA Polymer of Structural Class I

A two liter three-necked flask, equipped with a variable speed mechanical stirrer, nitrogen sparge tube on a pressure-equalizing addition funnel, and a distillation head and condenser was charged with 58 g (0.5 mole) 1,6-hexanediamine, 99 g (0.5 mole) methylenebisaniline (MBA) and 400 ml DMAC. The nitrogen sparge (375 cc/min.) and stirrer were started and 204 g (2.0 mole) of acetic anhydride was added over 9 minutes. Trimellitic anhydride, 384 g, (2.0 mole) was added over 2 minutes and followed by the addition of 198 g (1.0 mole) of MBA. The temperature of the bottom half of the spherical heating mantle surrounding the flask was set at 620° F. and the Variac controlling the top half was set at 40. After 90 minutes the polymer was extremely thick and 620 ml had been distilled. Heating was now stopped and the polymer was cooled under nitrogen and then ground. The polymer had an inherent viscosity of 0.11 dl/g in 100% sulfuric acid at 25° C. and 0.5% w/v concentration. The polymer was solid state polymerized by heating at 470° F. under high vacuum (0.12 mm Hg) for 17 hours. The inherent viscosity increased to 1.42.

Example 4—Preparation of the 4:3:1 TMA:MPDA:HMDA Polymer of Structural Class IV A five liter three-necked flask equipped as in Example 1 was charged with 324 g (3.0 mole) of metaphenylenediamine and 600 ml of DMAC. The nitrogen sparge (375 cc/min.) and stirring were started and 204 g (2.0 mole) of acetic anhydride was added over 10 minutes. This was followed by the addition of 786 g (4.0 mole) of trimellitic anhydride over 10 minutes. Meanwhile 204 g (2.0 mole) of acetic anhydride had been added to a stirred mixture of 116 g 1,6-hexanediamine and 200 ml of DMAC in a one liter three-necked flask under nitrogen. This product was now added over 2 minutes to the mixture in the five liter flask. The temperature of the bottom half of the spherical heating mantle surrounding the flask was set at 620° F. and the Variac controlling the top half was set at 30. After 140 minutes approximately 1150 ml of distillate had been collected and the temperature of the mantle was increased to 660° F. After stirring an additional 25 minutes under atmospheric pressure and 20 minutes under house vacuum (20 in Hg), 150 ml of additional distillate was collected and the polymer was cooled and ground. The polymer had an inherent viscosity of 0.42 (0.5% w/v) in 60:40 w/w phenol-tetrachloroethane at 25° C. The polymer was solid state polymerized by heating 16 hours at 471° F. and 16 hrs. at 515° F. under high vacuum (0.1 to 0.25 mm Hg). The inherent viscosity increased to 0.92. The mechanical properties for this polymer are given in Column 6 of Table IV.

Example 5—Preparation of the 4:3:1 TMA:MBA:HMDA Polymer of Structural Class IV A five liter three-necked flask equipped as in Example 1 was charged with 594 g (3.0 mole) of methylenebisaniline and 600 ml of DMAC. The nitrogen sparge (375 cc/min.) and stirring were started and 204 g (2.0 mole) of acetic anhydride was added over 2 minutes. This was followed by the addition of 768 g (4.0 mole) of trimellitic anhydride over 10 minutes. Meanwhile 204 g (2.0 mole) of acetic anhydride had been added to a stirred mixture of 116 g 1,6-hexanediamine and 200 ml of DMAC in a one liter three-necked flask under nitrogen. This product was now added over 2 minutes to the mixture in the five liter flask. The temperature of the bottom half of the spherical heating mantle surrounding the flask was set at 620° F. and the Variac controlling the top half was set at 30. After 100 minutes approximately 1250 ml of distillate had been collected and the temperature of the mantle was increased to 690° F. After stirring an additional 50 minutes under atmospheric pressure and 17 minutes under house vacuum (20 in Hg), 70 ml of additional distillate was collected and the polymer was cooled and ground. The polymer had an inherent viscosity of 0.39 (0.5% w/v) in 60:40 w/w phenol:tetrachloroethane at 25° C. The polymer was solid state polymerized by heating 15 hours at 471° F. under high vacuum (0.25 mm Hg). The inherent viscosity increased to 0.99. The mechanical properties for this polymer are given in Column 2 of Table IV.

Example 6—Preparation of the 4:3:1 TMA:MBA:MXDA Polymer of Structural Class V

A five liter three-necked flask, equipped with a variable speed, mechanical stirrer, nitrogen sparge tube on a pressure-equalizing addition funnel, and a distillation head and condenser was charged with 594 g (3.0 moles) methylenebisaniline and 700 ml of dimethylacetamide (DMAC). The nitrogen sparge and stirring were started and acetic anhydride 408 g (4.0 moles) was added over 2 minutes. Trimellitic anhydride 768 g (4.0 moles) was added over seven minutes. This was followed by the addition of 136 g (1.0 mole) of metaxylylenediamine in 100 ml of DMAC over a period of 2 minutes. The temperature of the spherical heating mantle surrounding the bottom half of the flask was set at 620° F. and the Variac controlling the top half was set at 30. After 72 minutes approximately 1040 ml had distilled and the temperature was then increased to 700° F. After 38 minutes more, 240 ml more distillate was collected and house vacuum (20 in Hg) was drawn on the system. After 5 minutes under vacuum about 20 ml of distillate was collected and the polymer had become extremely viscous. After cooling and grinding the polymer had an inherent viscosity of 0.37 dl/g in 60:40 w/w phenol:tetrachloroethane at 25° C. and 0.5% w/v concentration. The polymer was solid state polymerized by heating at 505° F. for 18 hours under high vacuum (0.55 mm Hg). The inherent viscosity increased to 0.81 dl/g in 60:40 w/w phenol:tetrachloroethane at 25° C. and 0.5% w/v concentration. The mechanical properties for this polymer are given in Column 4 of Table IV.

Example 7—Preparation of the 4:3:1 TMA:MBA:MXDA Polymer of Structural Class IV

A five liter three-necked flask equipped as in Example 1 was charged with 594 g (3.0 mole) of methylenebisaniline and 600 ml of DMAC. The nitrogen sparge (375 cc/min.) and stirring were started and 204 g (2.0 mole) of acetic anhydride was added over 10 minutes. This was followed by the addition of 768 g (4.0 mole) of trimellitic anhydride over 15 minutes. Meanwhile 204 g (2.0 mole) of acetic anhydride had been added to a stirred mixture of 136 g metaxylylenediamine and 200 ml of DMAC in a one liter three-necked flask under nitrogen. This product was now added over 1 minute to the mixture in the five liter flask. The temperature of the bottom half of the spherical heating mantle surrounding the flask was set at 620° F. and the Variac controlling the top half was set at 30. After 64 minutes approximately 1250 ml of distillate had been collected and the temperature of the mantle was increased to 670° F. After stirring an additional 10 minutes under atmospheric pressure and 25 minutes under house vacuum (20 in Hg), the polymer was cooled and ground. The polymer had an inherent viscosity of 0.40 (0.5% w/v) in 60:40 w/w phenol:tetrachloroethane at 25° C. The polymer was solid state polymerized by heating 16 hours at 480° F. and 16 hrs. at 500° F. under high vacuum (0.15 to 0.50 mm Hg). The inherent viscosity increased to 0.62.

Example 8—Preparation of the 3:2:1 TMA:OBA:MXDA Polymer of Structural Class V

A five liter three-necked flask, equipped with a variable speed, mechanical stirrer, nitrogen sparge tube on a pressure-equalizing addition funnel, and a distillation head and condenser was charged with 533.3 g (2.67 mole) of oxybisaniline and 700 ml of acetic acid. The nitrogen sparge (375 cc/min) and stirring were started and acetic anhydride, 408 g (4 moles) was added over 3 minutes. Trimellitic anhydride, 768 g (4.0 mole) was added over 2 minutes. This was followed by the addition of 181.3 g (1.33 mole) of metaxylylenediamine over 1 minute. The temperature of the bottom half of the spherical heating mantle surrounding the flask was set at 660° F. and the Variac controlling the top half was set at 30. After 24 minutes 360 ml of distillate had been collected and the temperature was raised to 675° F. After 65 minutes more an additional 640 ml of distillate had been collected; the polymer melt was quite thick, and the temperature was increased to 700° F. Stirring was continued for an additional 50 minutes under the nitrogen sparge (160 ml of distillate collected) and 10 minutes under house vacuum (20 in Hg). The polymer was then cooled under nitrogen and ground. The polymer had an inherent viscosity of 0.41 dl/g in 60:40 w/w phenol:tetrachloroethane at 25° C. and 0.5% w/v concentration. The polymer was solid state polymerized by heating under vacuum (0.40 mm Hg) for 16 hours at 503° F. and 16 hr. at 510° F. During this time the inherent viscosity of the polymer increased to 1.41.

Example 9—Preparation of a 4:3:1 TMA:MBA:HMDA Polymer of Structural Class VII

A five liter three-necked flask equipped as in Example 1 was charged with 116 g (1.0 mole) 1,6-hexanediamine, 594 g (3.0 mole) methylenebisaniline, and 800 ml DMAC. Acetic anhydride, 408 g (4.0 mole) was added over 5 minutes. Trimellitic anhydride, 768 g (4.0 mole) was added over 10 minutes. The temperature of the bottom half of the spherical heating mantle surrounding the flask was set at 620° F. and the Variac controlling the top half was set at 30. After 65 minutes 1050 ml of distillate was collected and the temperature was increased to 670° F. Stirring was continued 40 minutes under the nitrogen sparge (250 ml of distillate collected) and 25 minutes under house vacuum (20 in Hg) 50 ml of distillate collected. The polymer was then cooled under nitrogen and ground. The polymer had an inherent viscosity of 0.59 dl/g in 60:40 w/w phenol:tetrachloroethane at 25° C. and 0.5% w/v concentration. The polymer was solid state polymerized by heating under vacuum (0.15–0.50 mm Hg) for 16 hr. at 478° F. and 24 hr. at 500° F. During this time the inherent viscosity increased to 0.91.

Example 10—Preparation of a 4:3:1 TMA:MPDA:HMDA Polymer of Structural Class VII A five liter three-necked flask equipped as in Example 1 was charged with 116 g (1.0 mole) 1,6-hexanediamine, 324 g (3.0 mole) metaphenylenediamine, and 800 ml DMAC. Acetic anhydride, 408 g (4.0 mole) was added over 5 minutes. Trimellitic anhydride, 768 g (4.0 mole) was added over 6 minutes. The temperature of the bottom half of the spherical heating mantle surrounding the flask was set at 620° F. and the Variac controlling the top half was set at 30. After 64 minutes 775 ml of distillate had been collected and the temperature was increased to 670° F. Stirring was continued 45 minutes under the nitrogen sparge (465 ml of distillate collected) and 20 minutes under house vacuum (20 in Hg) 10 ml of distillate collected. The polymer was then cooled under nitrogen and ground. The polymer had an inherent viscosity of 0.49 dl/g in 60:40 w/w phenol:tetrachloroethane at 25° C. and 0.5% w/v concentration. The polymer was solid state polymerized by heating under vacuum (0.25 mm Hg) for 16 hr. at 518° F. During this time the inherent viscosity increased to 0.82.

Example 11—Preparation of the 3:2:1 Polymer of Trimellitic anhydride (TMA):metatoluenediamine (MTDA-80/20 mixture of 2,4/2,6 isomers): 1,6 hexanediamine (HMDA) of Structural Class V using 50% acetylation of total amine functionality A mixture of 325 g (2.67 mole) of MTDA and 555 g of acetic acid was placed in a five liter-3 necked flask equipped with a metal stirrer, addition funnel with nitrogen inlet, and distillation takeoff and condenser. The system was flushed with $N_2$ at 375 cc/min. Acetic anhydride 408 g (4.0 mole) was added rapidly over a few minutes. This was followed by the addition of 768 g (4.0 mole) of TMA. Finally 155 g (1.33 mole) of HMDA was added over a few minutes. The temperature of the bottom half of the spherical heating mantle surrounding the flask was set at 700° F. and the Variac controlling the top half was set at 40. After 75 minutes of heating and stirring, approximately 980 mls of distillate had been collected and the molten prepolymer was fairly thick. Heating and stirring were continued for 22 minutes more under 150 torr absolute. The thick viscous polymer was then cooled and ground. The inherent viscosity of the polymer was 0.25 at a concentration of 0.5% w/v in N-methylpyrrolidone (NMP) at 25° C. The polymer was solid state polymerized at 480° F. under high vacuum (3.0 torr) and reground. The inherent viscosity increased to 0.44. A repeat of the solid state polymerization (480° F., overnight, 0.25 torr) increased the inherent viscosity to 0.81 (some gel particles present).

Example 12—Preparation of the 3:2:1 Polymer of TMA:MTDA:HMDA of Structural Class V using Total Acetylation of Aromatic Diamine Functionality The procedure was similar to Example 11 except 2 moles of acetic anhydride were used to acetylate each mole of MTDA. The inherent viscosity of the final product was 0.65.

Example 13—Preparation of the 3:2:1 Polymer of TMA:MTDA:HMDA of Structural Class VII using 50% Acetylation of Total Amine Functionality The preparation was similar to that of Example 11 except that the 408 g of acetic anhydride was added to a mixture of the MTDA and HMDA prior to the TMA addition. The inherent viscosity of the final product was 0.69.

Example 14—Preparation of the 3:2:1 Polymer of TMA:MTDA:HMDA of Structural Class VII using 90% Acetylation of Total Amine Functionality The procedure was similar to that of Example 13 except 1.8 moles of acetic anhydride per mole of diamine was added to the mixture of MTDA and HMDA. The inherent viscosity of the final product was 0.88.

TABLE V

Mechanical Properties of 3:2:1 TMA:MTDA:HMDA Copolymers

| Polymer Class | | V | V | VII | VII |
|---|---|---|---|---|---|
| Acetylation level | | 50 | 67 | 50 | 90 |
| Tensile Strength, psi | D-638 | 20,600 | 20,400 | 20,600 | 17,900 |
| Elongation at Break, % | D-638 | 10.1 | 12.1 | 11.4 | 8.1 |
| Flexural Strength, psi | D-790 | 29,100 | 29,000 | 28,600 | 28,300 |
| Flexural Modulus, psi | D-790 | 554,000 | 555,000 | 542,000 | 554,000 |
| Izod Impact, ft.lb./in. notch | D-256 | 1.03 | 0.88 | 1.17 | 1.12 |
| Tensile Impact, ft.lb./in.$^2$ | D-1822 | 35.9 | 23.7 | 78.2 | 38.6 |
| H.D.T. @ 264 psi, °F. | D-648 | 429 | 417 | 427 | 413 |
| Example # | | 11 | 12 | 13 | 14 |

TABLE VI

Effect of Thermal Aging @ 400° F. in Air on the Physical Properties of the 3:2:1 TMA:MTDA:HMDA Polymer

| | Structural Class VII | | | Structural Class V | | |
|---|---|---|---|---|---|---|
| | Control | 100 hr. | 200 hr. | Control | 100 hr. | 200 hr. |
| Tensile Strength, psi | 20,600 | 22,500 | 22,300 | 20,600 | 22,000 | 19,300 |
| Elongation at Break, % | 11.4 | 9.9 | 9.1 | 10.1 | 10.9 | 8.5 |
| Flexural Strength, psi | 28,600 | — | — | 29,100 | — | — |
| Flexural Modulus, psi | 542,000 | — | — | 554,000 | — | — |
| Tensile Impact, ft.lb./in.$^2$ | 78.2 | 40.9 | 28.3 | 35.9 | 35.1 | 48.9 |
| Izod, ft.lb./in. notch | 1.17 | — | — | 1.03 | — | — |
| H.D.T. @ 264 psi, °F. | 427 | — | — | 429 | — | — |
| | 500 hr. | 1000 hr. | | 500 hr. | 1000 hr. | |
| Tensile Strength, psi | 11,300 | 7,770 | | 22,300 | 20,200 | |
| Elongation at Break, % | 3.4 | 2.2 | | 10.1 | 8.1 | |
| Flexural Strength, psi | — | 11,300 | | — | 29,100 | |
| Flexural Modulus, psi | — | 546,000 | | — | 540,000 | |
| Tensile Impact, | 18.0 | 7.9 | | 26.3 | 23.6 | |

TABLE VI-continued

| Effect of Thermal Aging @ 400° F. in Air on the Physical Properties of the 3:2:1 TMA:MTDA:HMDA Polymer | | | | |
|---|---|---|---|---|
| | Structural Class VII | | Structural Class V | |
| ft.lb./in.² | | | | |
| Izod, ft.lb./in. notch | — | 0.18 | — | 0.67 |
| H.D.T. @ 264 psi, °F. | — | 455 | — | 458 |

We claim:

1. A process for the preparation of tailored linear injection moldable polyamide-imide copolymers and terpolymers containing both aromatic and aliphatic moieties derived from aromatic and aliphatic diamines which process comprises reacting at a temperature of about 50° to 700° F. fully or partially acylated aromatic or aliphatic diamines or mixtures of fully or partially acylated aromatic and aliphatic diamines with tricarboxylic acid anhydride compounds and aliphatic or aromatic diamines or mixtures of aromatic and aliphatic diamines wherein the ratio of the total moles of fully or partially acylated diamines and unacylated diamines to the tricarboxylic acid anhydride compound is about 1:1 and about 40 to 100% of the total amine functionality is acylated.

2. The process of claim 1 wherein the molar ratio of all acylated and unacylated aromatic to all acylated and unacylated aliphatic diamines is about 1:1 to 9:1 and wherein the amine functionality is reacted with the tricarboxylic acid anhydride compound prior to reaction of the acylated amine functionality.

3. The process of claim 1 wherein the tricarboxylic acid anhydride compound is trimellitic anhydride.

4. A process for the preparation of tailored linear injection moldable polyamide-imide copolymers and terpolymers containing both aromatic and aliphatic moieties derived from aromatic and aliphatic diamines which process comprises reacting at a temperature of about 50° to 700° F. fully acylated aliphatic diamines or mixtures of fully acylated aromatic and aliphatic diamines with tricarboxylic acid anhydride compounds and aromatic diamines wherein the molar ratio of the acylated diamines: the tricarboxylic acid anhydride: the aromatic diamine is about 5:10:5 wherein the copolymer produced comprises the following structural units:

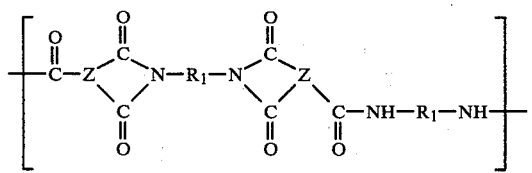

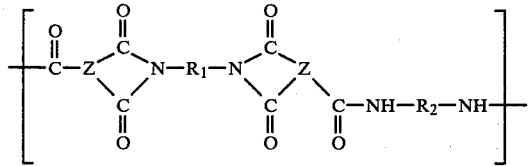

wherein "Z" is a trivalent aromatic radical, R₁ is a divalent aromatic radical of 6 to 20 carbon atoms joined directly or containing stable linkages consisting of -S-, -O-,

-SO₂- , -CO- or methylene radicals, R₂ is a divalent aliphatic, cycloaliphatic or araliphatic radical of from 2 to 18 carbon atoms.

5. The process of claim 4 wherein free amine functionality is reacted with the tricarboxylic acid anhydride prior to reaction of the acylated amine functionality and wherein the molar ratio of all acylated and unacylated aromatic diamine to all acylated and unacylated aliphatic diamine is about 1:1 to 9:1.

6. A process for the preparation of tailored linear injection moldable polyamide-imide copolymers and terpolymers containing both aromatic and aliphatic moieties derived from aromatic and aliphatic diamines which process comprises reacting at a temperature of about 50° to 700° F. fully acylated aromatic diamines with tricarboxylic acid anhydride compounds and aliphatic diamines or mixtures of aliphatic and aromatic diamines wherein the molar ratio of the acylated diamine: the tricarboxylic acid anhydride: the aliphatic and aromatic diamines is about 5:10:5 wherein the copolymer produced comprises the following structural units:

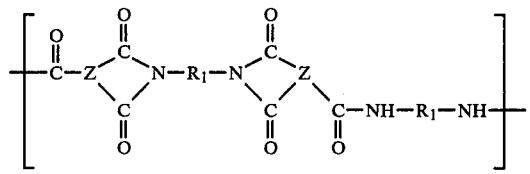

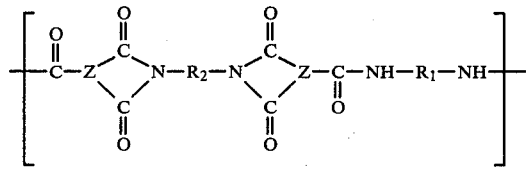

wherein "Z" is a trivalent aromatic radical, R₁ is a divalent aromatic radical of 6 to 20 carbon atoms joined directly or containing stable linkages consisting of -S-, -O-,

-SO₂-, -CO- or methylene radicals, R₂ is a divalent aliphatic, cycloaliphatic or araliphatic radical of from 2 to 18 carbon atoms.

7. The process of claim 6 wherein free amine functionality is reacted with the tricarboxylic acid anhydride prior to reaction of the acylated amine functionality and wherein the molar ratio of all acylated and unacylated aromatic diamine to all acylated and unacylated aliphatic diamine is about 1:1 to 9:1.

8. A process for the preparation of tailored linear injection moldable polyamide-imide copolymers and terpolymers containing both aromatic and aliphatic moieties derived from aromatic and aliphatic diamines which process comprises reacting at a temperature of about 50° to 700° F. fully acylated aromatic and aliphatic diamines with tricarboxylic acid anhydride compounds and aliphatic and aromatic diamines wherein the molar ratio of the acylated diamine: the tricarboxylic acid anhydride: the aliphatic and aromatic diamine is about 5:10:5 wherein the copolymer produced comprises the following structural units:

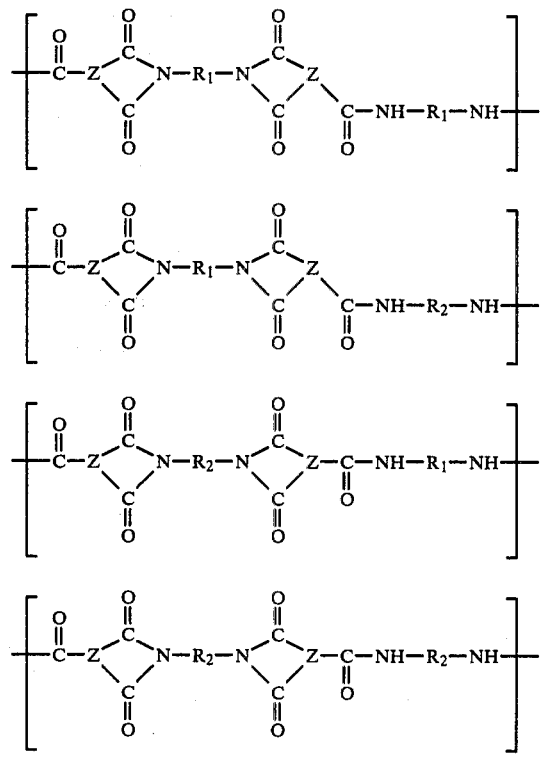

wherein "Z" is a trivalent aromatic radical, $R_1$ is a divalent aromatic radical of 6 to 20 carbon atoms joined directly or containing stable linkages consisting of -S-, -O-,

-SO$_2$-, -CO- or methylene radicals, $R_2$ is a divalent aliphatic, cycloaliphatic or araliphatic radical of from 2 to 18 carbon atoms.

9. The process of claim 8 wherein free amine functionality is reacted with the tricarboxylic acid anhydride prior to reaction of the acylated amine functionality and wherein the molar ratio of all acylated and unacylated aromatic diamine to all acylated and unacylated aliphatic diamine is about 1:1 to 9:1.

10. A process for the preparation of tailored linear injection moldable polyamide-imide copolymers and terpolymers containing both aromatic and aliphatic moieties derived from aromatic and aliphatic diamines which process comprises reacting at a temperature of about 50° to 700° F. mixtures of fully or partially acylated aromatic and fully acylated aliphatic diamines with tricarboxylic acid anhydride compounds and aromatic diamines wherein the ratio of the total moles of fully acylated diamines, partially acylated diamines, and unacylated diamines to the tricarboxylic acid anhydride compound is 1:1 and about one half of the total amine functionality is acylated wherein the copolymer produced comprises the following structural units:

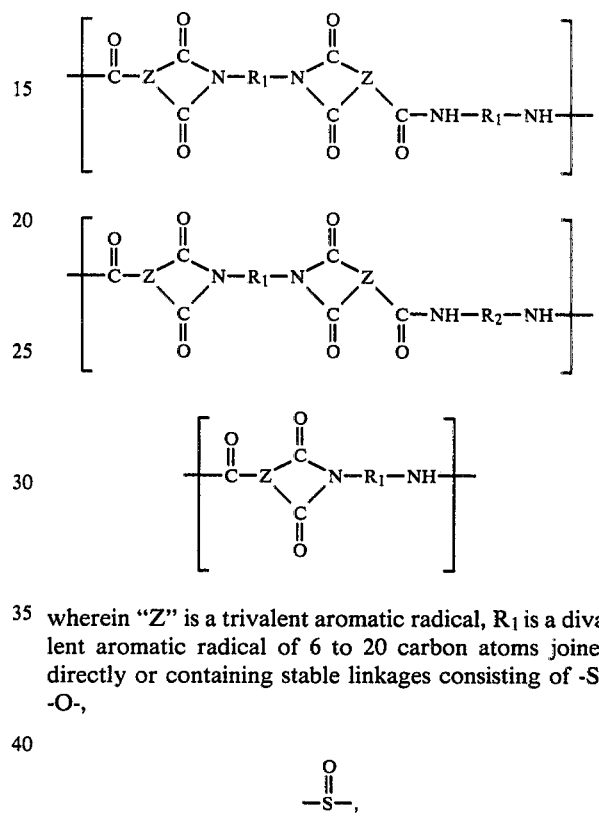

wherein "Z" is a trivalent aromatic radical, $R_1$ is a divalent aromatic radical of 6 to 20 carbon atoms joined directly or containing stable linkages consisting of -S-, -O-,

-SO$_2$-, -CO- or methylene radicals, $R_2$ is a divalent aliphatic, cycloaliphatic or araliphatic radical of from 2 to 18 carbon atoms.

11. The process of claim 10 wherein free amine functionality is reacted with the tricarboxylic acid anhydride prior to reaction of the acylated amine functionality and wherein the molar ratio of all acylated and unacylated aromatic diamine to all acylated and unacylated aliphatic diamine is about 1:1 to 9:1.

12. A process for the preparation of tailored linear injection moldable polyamide-imide copolymers and terpolymers containing both aromatic and aliphatic moieties derived from aromatic and aliphatic diamines which process comprises reacting at a temperature of about 50° to 700° F. fully or partially acylated aromatic diamines with tricarboxylic acid anhydride compounds and aliphatic diamines or mixtures of aliphatic and aromatic diamines wherein the ratio of the total moles of fully acylated diamines, partially acylated diamines and unacylated diamines to the tricarboxylic acid anhydride compound is 1:1 and at least one half of the total amine functionality is acylated wherein the copolymer produced comprises the following structural units:

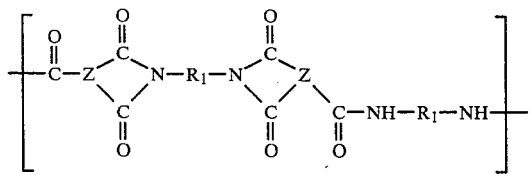

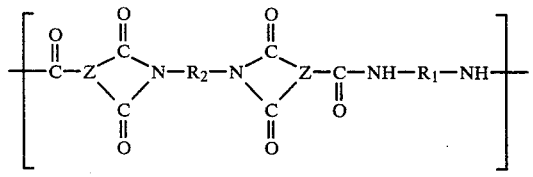

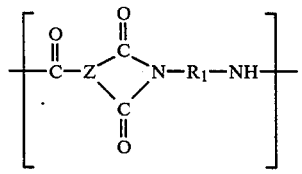

wherein "Z" is a trivalent aromatic radical, R₁ is a divalent aromatic radical of 6 to 20 carbon atoms joined directly or containing stable linkages consisting of -S-, -O-,

-SO₂-, -CO- or methylene radicals, R₂ is a divalent aliphatic, cycloaliphatic or araliphatic radical of from 2 to 18 carbon atoms.

13. The process of claim 12 wherein free amine functionality is reacted with the tricarboxylic acid anhydride prior to reaction of the acylated amine functionality and wherein the molar ratio of all acylated and unacylated aromatic diamine to all acylated and unacylated aliphatic diamine is about 1:1 to 9:1.

14. A process for the preparation of tailored linear injection moldable polyamide-imide copolymers and terpolymers containing both aromatic and aliphatic moieties derived from aromatic and aliphatic diamines which process comprises reacting at a temperature of about 50° to 700° F. fully or partially acylated aromatic diamines and fully acylated aliphatic diamines with tricarboxylic acid anhydride compounds and aliphatic and aromatic diamines wherein the ratio of the total moles of fully acylated diamines, partially acylated diamines, and unacylated diamines to the tricarboxylic acid anhydride compound is 1:1 and about one half of the total amine functionality is acylated wherein the copolymer produced comprises the following structural units:

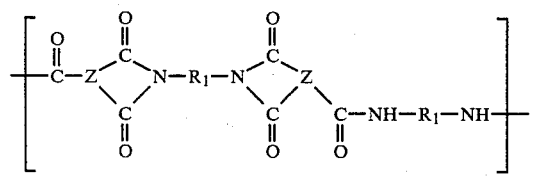

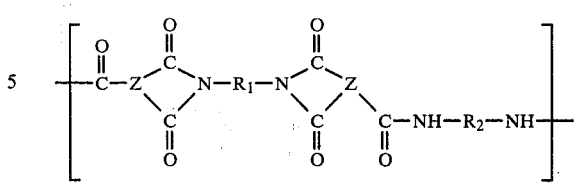

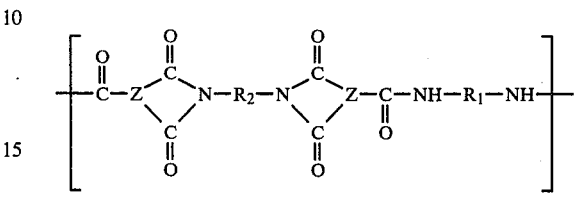

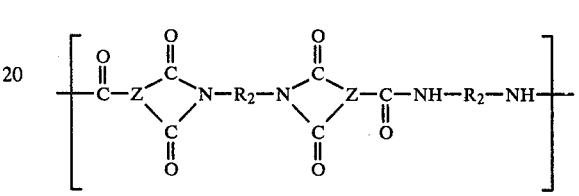

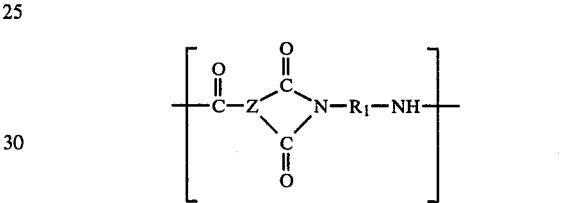

wherein "Z" is a trivalent aromatic radical, R₁ is a divalent aromatic radical of 6 to 20 carbon atoms joined directly or containing stable linkages consisting of -S-, -O-,

-SO₂-, -CO- or methylene radicals, R₂ is a divalent aliphatic, cycloaliphatic or araliphatic radical of from 2 to 18 carbon atoms.

15. The process of claim 14 wherein free amine functionality is reacted with the tricarboxylic acid anhydride prior to reaction of the acylated amine functionality and wherein the molar ratio of all acylated and unacylated aromatic diamine to all acylated and unacylated aliphatic diamine is about 1:1 to 9:1.

16. A process for the preparation of tailored linear injection moldable polyamide-imide copolymers and terpolymers containing both aromatic and aliphatic moieties derived from aromatic and aliphatic diamines which process comprises reacting at a temperature of about 50° to 700° F. fully or partially acylated aromatic and aliphatic diamines with tricarboxylic acid anhydride compounds wherein the ratio of the total moles of diamines to the tricarboxylic acid anhydride compound is 1:1 and 50 to 100% of the total amine functionality is acylated wherein the copolymer produced comprises the following structural units:

[Structural formula 1 — repeating unit]

[Structural formula 2 — repeating unit]

[Structural formula 3 — repeating unit]

[Structural formula 4 — repeating unit]

[Structural formula 5 — repeating unit]

[Structural formula 6 — repeating unit]

wherein "Z" is a trivalent aromatic radical, $R_1$ is a divalent aromatic radical of 6 to 20 carbon atoms joined directly or containing stable linkages consisting of -S-, -O-, $$-\overset{O}{\underset{\|}{S}}-,$$

-$SO_2$- -CO- or methylene radicals, $R_2$ is a divalent aliphatic, cycloaliphatic or araliphatic radical of from 2 to 18 carbon atoms.

17. The process of claim 16 wherein free amine functionality is reacted with the tricarboxylic acid anhydride prior to reaction of the acylated amine functionality and wherein the molar ratio of all acylated and unacylated aromatic diamine to all acylated and unacylated aliphatic diamine is about 1:1 to 9:1.

18. The process of claim 12 wherein "Z" is

[structure: substituted benzene ring]

$R_1$ is

[structure: diphenylmethane —⟨⟩—$CH_2$—⟨⟩—]

and $R_2$ is —$(CH_2)_6$—
and wherein the molar ratio of Z:$R_1$:$R_2$ is 4:3:1.

19. The process of claim 12 wherein "Z" is

[structure: substituted benzene ring]

$R_1$ is

[structure: diphenyl ether —⟨⟩—O—⟨⟩—]

and $R_2$ is

[structure: m-xylylene —$CH_2$—⟨⟩—$CH_2$—]

and wherein the molar ratio of Z:$R_1$:$R_2$ is 3:2:1.

20. The process of claim 4 wherein "Z" is

[structure: substituted benzene ring]

$R_1$ is

[structure: diphenylmethane —⟨⟩—$CH_2$—⟨⟩—]

and $R_2$ is —$(CH_2)_6$—
and wherein the molar ratio of Z:$R_1$:$R_2$ is 4:3:1.

21. The process of claim 10 wherein "Z" is

[structure: substituted benzene ring]

$R_1$ is

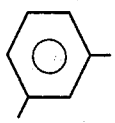

and R₂ is —(CH₂)₆—
and wherein the molar ratio of Z:R₁:R₂ is 4:3:1.

22. The process of claim 12 wherein "Z" is

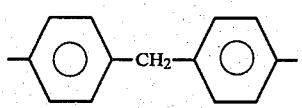

R₁ is

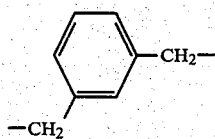

and R₂ is and wherein the molar ratio of Z:R₁:R₂ is 4:3:1.

23. The process of claim 10 wherein "Z" is

R₁ is

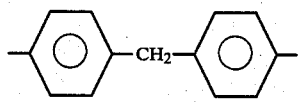

and R₂ is

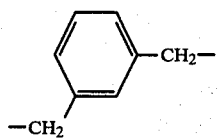

and wherein the molar ratio of Z:R₁:R₂ is 4:3:1.

24. The process of claim 16 wherein "Z" is

R₁ is

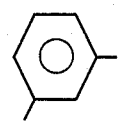

and R₂ is —(CH₂)₆—
and wherein the molar ratio of Z:R₁:R₂ is 4:3:1.

25. The process of claim 12 wherein "Z" is

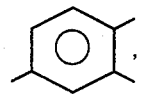

R₁ is

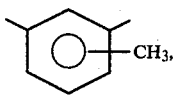

and R₂ is —(CH₂)₆—.

26. The process of claim 16 wherein "Z" is

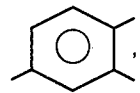

R₁ is

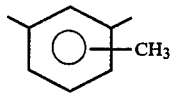

and R₂ is —(CH₂)₆—.

27. The copolymer and terpolymer prepared according to the process of claim 1 wherein the copolymer and terpolymer is in the form of a molded object.

28. The copolymer produced according to claim 4 wherein the copolymer is in the form of a molded object.

29. The copolymer produced according to claim 12 wherein the copolymer is in the form of a molded object.

30. The copolymer produced according to claim 10 wherein the copolymer is in the form of a molded object.

31. The copolymer produced according to claim 16 wherein the copolymer is in the form of a molded object.

32. As a composition of matter, the copolymer prepared according to claim 4.

33. As a composition of matter, the copolymer prepared according to claim 6.

34. As a composition of matter, the copolymer prepared according to claim 8.

35. As a composition of matter, the copolymer prepared according to claim 10.

36. As a composition of matter, the copolymer prepared according to claim 12.

37. As a composition of matter, the copolymer prepared according to claim 14.

38. As a composition of matter, the copolymer prepared according to claim 16.

39. As a composition of matter, the copolymer prepared according to claim 18.

40. As a composition of matter, the copolymer prepared according to claim 19.

41. As a composition of matter, the copolymer prepared according to claim 20.

42. As a composition of matter, the copolymer prepared according to claim 21.

43. As a composition of matter, the copolymer prepared according to claim 22.

44. As a composition of matter, the copolymer prepared according to claim 23.

45. As a composition of matter, the copolymer prepared according to claim 24.

46. As a composition of matter, the copolymer prepared according to claim 25.

47. As a composition of matter, the copolymer prepared according to claim 26.

* * * * *